United States Patent
Ueda

(10) Patent No.: US 7,171,666 B2
(45) Date of Patent: Jan. 30, 2007

(54) PROCESSOR MODULE FOR A MULTIPROCESSOR SYSTEM AND TASK ALLOCATION METHOD THEREOF

(75) Inventor: Makoto Ueda, Kyoto (JP)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 09/682,188

(22) Filed: Aug. 2, 2001

(65) Prior Publication Data

US 2002/0040382 A1 Apr. 4, 2002

(30) Foreign Application Priority Data

Aug. 4, 2000 (JP) .............................. 2000-236740

(51) Int. Cl.
G06F 9/46 (2006.01)
G06F 12/00 (2006.01)

(52) U.S. Cl. ..................... 718/104; 711/144; 711/145; 711/147

(58) Field of Classification Search ................ 718/1, 718/100–108; 711/1–6, 100, 144–145, 147
See application file for complete search history.

(56) References Cited

U.S. PATENT DOCUMENTS

| | | | |
|---|---|---|---|
| 5,349,656 A | * | 9/1994 | Kaneko et al. ............. 718/102 |
| 5,598,551 A | * | 1/1997 | Barajas et al. ............. 711/157 |
| 5,713,004 A | | 1/1998 | Kimmel et al. |
| 6,665,699 B1 | * | 12/2003 | Hunter et al. ............. 718/102 |
| 2002/0053004 A1 | * | 5/2002 | Pong ......................... 711/119 |

FOREIGN PATENT DOCUMENTS

| | | |
|---|---|---|
| JP | 03-218534 | 9/1991 |
| JP | UP4-321136 | 11/1992 |
| JP | UP5-151064 | 6/1993 |
| JP | 08190537 | 7/1996 |
| JP | 09034848 | 2/1997 |
| JP | 10-078942 | 3/1998 |

OTHER PUBLICATIONS

English Abstract***.
Assaf Schuster et al., "Using Remote Access Histories for Thread Scheduling in Distributed SH Systems," Sep. 1998.
Japanese Search Report for Appln. No. 2000-236740.
Yoshihiro Nakashima et al., Development of Parallel ACOS PX7800 Enhanced Model, NEC, vol. 50, No. 1, 1997.

* cited by examiner

*Primary Examiner*—Meng-Al T. An
*Assistant Examiner*—Kenneth Tang
(74) *Attorney, Agent, or Firm*—F. Chau & Associates LLC

(57) ABSTRACT

A multiprocessor system includes a plurality of processor modules having a detector for detecting accesses by respective tasks to data shared among cache memories in the processor modules. Also included is a storage device for storing an address of the shared data, identification information of the tasks that accessed the shared data, and the number of accesses to the same shared data by the same task.

15 Claims, 9 Drawing Sheets

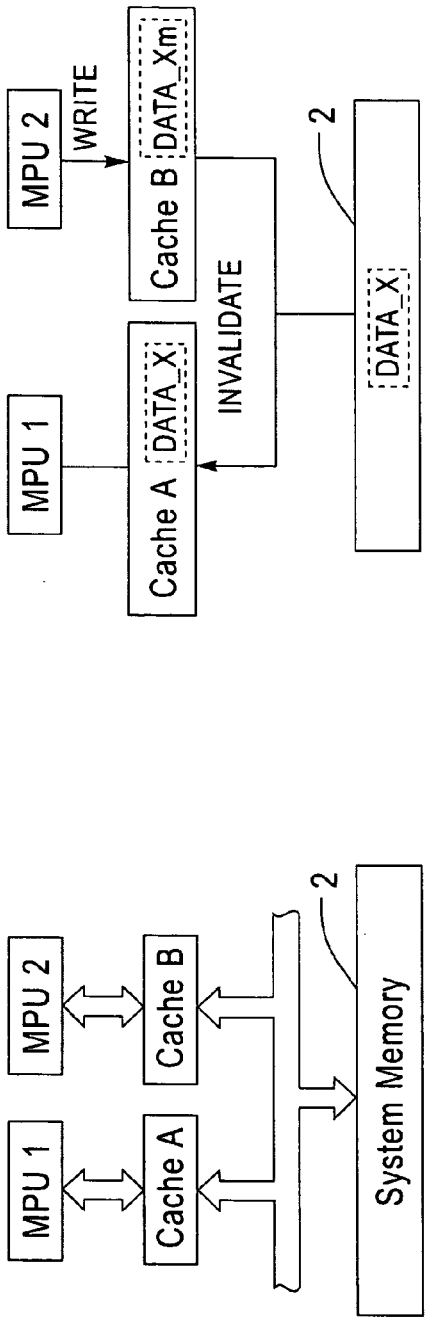
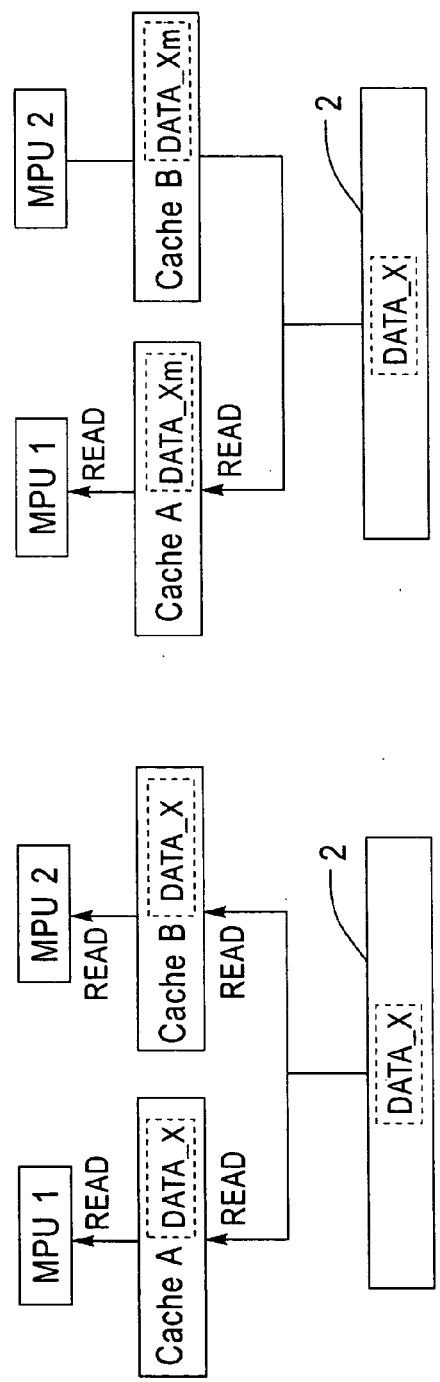

PROCESSOR MODULE FOR A MULTIPROCESSOR SYSTEM AND TASK ALLOCATION METHOD THEREOF

BACKGROUND OF INVENTION

1. Field of the Invention

The present invention relates to a processor module for a multiprocessor system and a task allocation thereof, and more particularly to a multiprocessing system having a plurality of modules.

2. Description of Related Art

In order to improve a processing speed of a microprocessor unit MPU), a multiprocessor system including a plurality of MPUs is employed. In this multiprocessor system, parallel processing is performed using a plurality of MPUs. For example, as shown in FIG. 10(a), a multiprocessor system includes MPUs 1 and 2 which share a system memory 2. An operating system (OS) for supporting a multiprocessor is also needed to perform multiprocessing. For example, a scheduler in an OS allocates a task or a subdivision of task (thread) to each MPU. As shown in FIG. 11, when the scheduler is started (S100), the scheduler allocates a task to each MPU on the basis of dispatching priorities (S106). The scheduler is started when tasks are synchronized. For example, the scheduler is started by the OS at regular intervals.

The MPUs 1 and 2 shown in FIG. 10(a) comprise cache memories A and B, respectively, which temporarily store a part of data to be stored in the system memory 2. In this specification, "cache memory" will be hereinafter referred simply to as "cache". In the multiprocessor system, parallel processing is performed while the system memory 2 is shared. Therefore, it is necessary to keep data coherent between memories. In general, the caches A and B are write-back cashes. Therefore, it is necessary to keep data coherent between the caches A and B.

For example, when the MPUs 1 and 2 request data (DATA_X) stored in the system memory 2, the DATA_X is copied from the system memory 2 to the caches A and B, as shown in FIG. 10(b). When the MPUs 1 and 2 only read data, the same data DATA_X is stored in the caches A and B. Thus data coherency is secured.

However, when the MPU 2 updates the DATA_X stored in the cache B to DATA_Xm, the DATA_X stored in the cache A is no longer the most recent copy of the data but becomes an invalid data which should not be used. In this case, data coherency is not secured. Generally, as shown in FIG. 10(c), the DATA_X in the cache A is invalidated so that the MPU 1 cannot read the invalidated DATA_X.

When the MPU 1 requests reading of DATA_X, the requested DATA_X is not found because the DATA_X has been invalidated in the cache A. Specifically, a cache miss occurs. Since the DATA_X is not found in the cache A, the DATA_Xm stored in the cache B is copied to the cache A, as shown in FIG. 10(d). In this state, the caches A and B store the same data (DATA_Xm), and thus a data coherency is secured. However, when the DATA_Xm is updated in one of the caches A and B, the data stored in the other cache is invalidated and the most recent data stored in the one cache is copied to the other cache in the same manner as described above.

Alternatively, when the MPU 1 requests an updating of data DATA_X with the DATA_X invalidated in the cache A as shown in FIG. 10(c), a cache miss occurs. Since an updated data (DATA_Xm) is not stored in the cache A, the DATA_Xm stored in the cache B is copied to the cache A as shown in FIG. 10(d). After performing optional processes, the DATA_Xm is updated to the DATA_Xm2 (not shown). In this state, the DATA_Xm2 is the most recent copy of the data, and therefore, the DATA_Xm stored in the cache B is invalidated (not shown). A frequent occurrence of data invalidation and cache miss decreases the utilization of the MPU, so that there is no point in using a plurality of MPUs. In this specification, the occurrence of such data invalidation and cache miss will be hereinafter referred to as "ping-pong event".

Therefore, an object of the present invention is to reduce the occurrence of ping-pong events.

SUMMARY OF INVENTION

A first feature of the present invention includes a multiprocessor system having: (a) a plurality of processor modules including a detector for detecting accesses by respective tasks to data shared among cache memories in the processor modules and a storage for storing an address of the shared data, identification information of the tasks that accessed the shared data, and the number of accesses to the same shared data by the same task; and (b) an allocator for allocating tasks that make frequent accesses to the same shared data to processors in the same module, on the basis of the number of accesses.

Another feature of the present invention includes a processor module for use in the multiprocessor system having a detector for detecting accesses by respective tasks to data shared among cache memories in the processor modules; and a storage device for storing an address of the shared data, identification information of the tasks that accessed the shared data, and the number of accesses to the same shared data by the same task.

Still another feature of the present invention includes a method of allocating a task in multiprocessing according to the present invention, comprises the steps of monitoring access conditions by respective tasks to data shared among cache memories in processor modules and allocating tasks that make frequent accesses to the same shared data to processors in the same module, on the basis of the access conditions.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

FIG. 10(*a*) is a block diagram of an example of a conventional multiprocessor, and FIGS. 10(*b*) to 10(*d*) are block diagrams showing an example of data update and invalidation in a cache.

DETAILED DESCRIPTION

A processor module of the present invention is capable of monitoring addresses that caused a ping-pong event, tasks accessed to the addresses, and the number of accesses to the same address by the same task. In a multiprocessor system using such processor module, tasks that frequently access the same data are allocated to processors in the same module.

In a task allocation method in multiprocessing according to the present invention, addresses that caused a ping-pong event, tasks accessed to the addresses, and the number of accesses to the same address by the same task are monitored, and tasks that frequently access the same data are allocated to processors in the same module. The tasks can be allocated to the respective processors in such a manner that the number of accesses from different modules are minimized.

Figure 6:
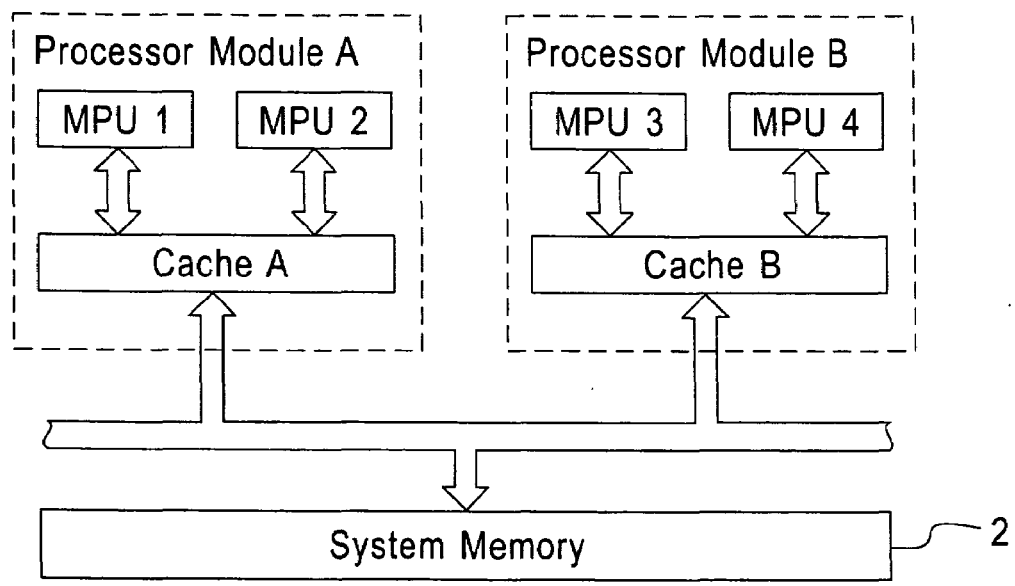
FIG. 6 is a block diagram showing a basic configuration of a multiprocessor system according to the present invention.

In a multiprocessor system according to the present invention, there are a plurality of processor modules comprising one cache and a plurality of processors sharing the cache. For example, as shown in FIG. 6, a multiprocessor system comprises: a processor module A including a cache A and MPUs 1 and 2 which share the cache A and a processor module B including a cache B and MPUs 3 and 4 which share the cache B. In this specification, a processor module will be hereinafter referred to simply as "module".

Figure 7A:
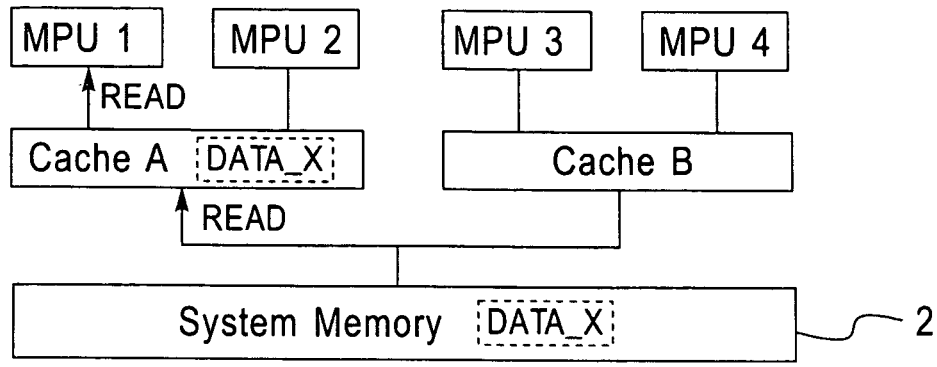
FIGS. 7(*a*), 7(*b*), and 7(*c*) are block diagrams showing an example of data updating in the cache shown in FIG. 6).
Figure 7B:
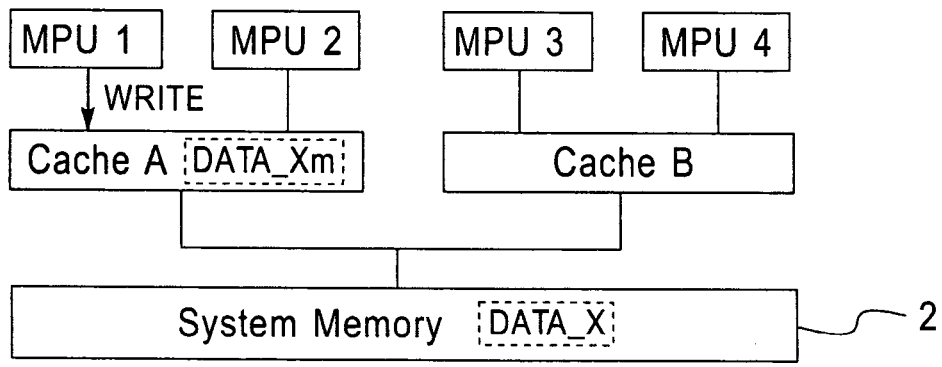
Figure 7C:
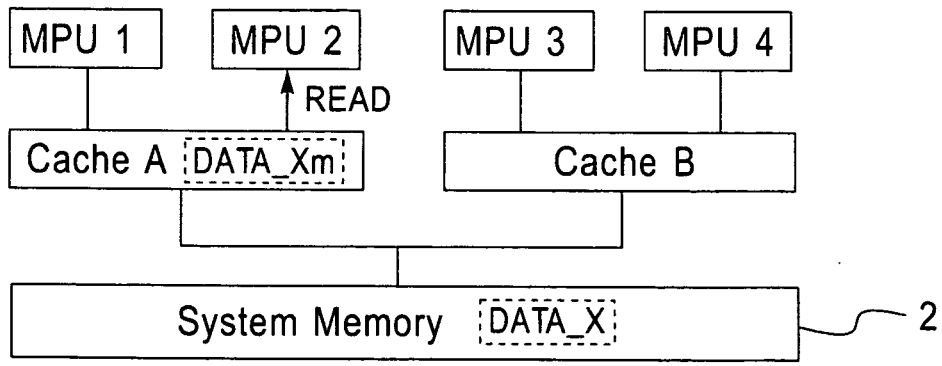
Figure 8A:
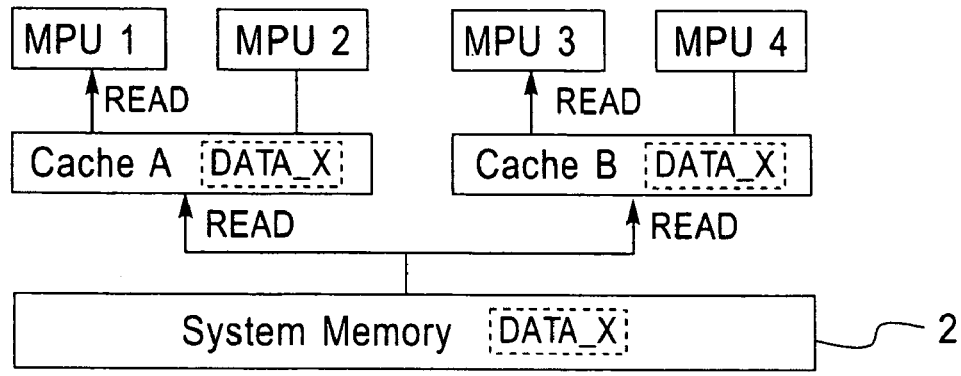
FIGS. 8(*a*), 8(*b*), and 8(*c*) are block diagrams showing an example of data updating and invalidation in the caches shown in FIG. 6.
Figure 8B:
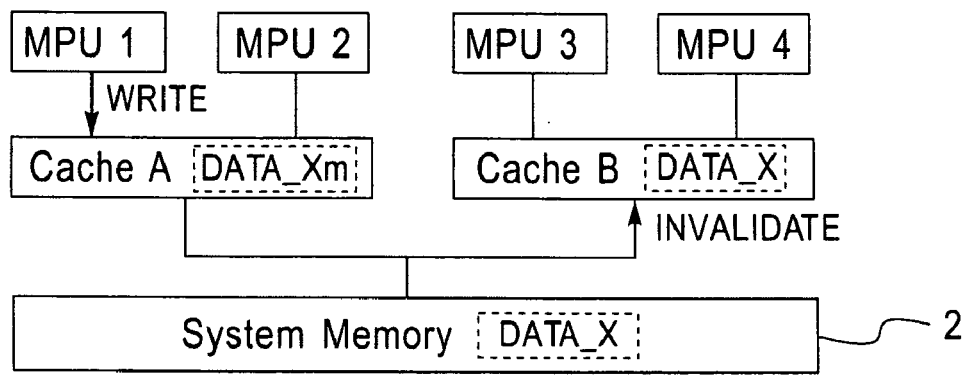
Figure 8C:
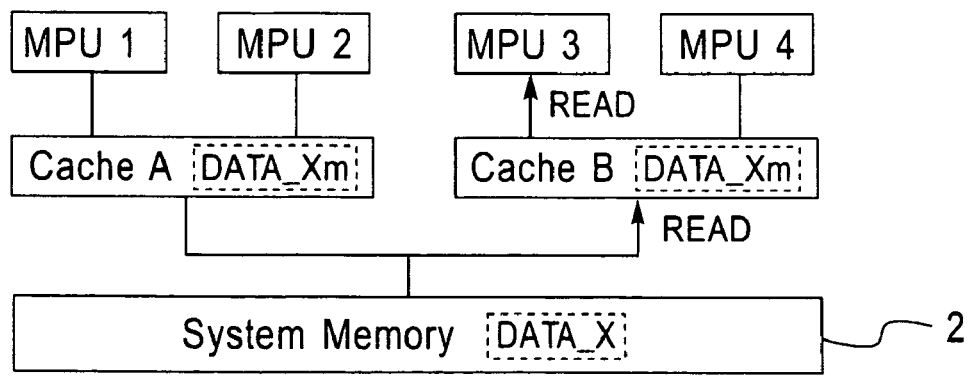

In the processor modules shown in FIG. 6, no ping-pong events occur between processors in the same module, because a cache is shared among the processors in the same module. For example, as shown in FIGS. 7(*a*) to 7(*c*), when the MPUs 1 and 2, which are included in the same module, access the data (DATA_X) stored in the cache A, no ping-ping events occur between the MPUs 1 and 2. However, ping-pong events occur between processors in different modules, as in the case of the multiprocessor system shown in FIG. 10(*a*). For example, as shown in FIGS. 8(*a*) to 8(*c*), when the MPU 1 and MPU 3, which are included in different modules, access the shared data (DATA_X) stored in the cache A and cache B, respectively, an ping-ping event occurs between the MPUs 1 and 3, as in the case of the multiprocessor system shown in FIGS. 10(*b*) to 10(*d*). FIGS. 7(*a*) and 8(*a*) show that the data (DATA_X) is read from the system memory 2, FIGS. 7(*b*) and 8(*b*) show that the MPU 1 updates the data, and FIGS. 7(*c*) and 8(*c*) show that the MPUs 2 and 3 read the updated data (DATA_Xm), respectively.

Embodiments of the multiprocessor system, the processor module for use therein, and the task allocation method in multiprocessing according to the present invention will hereinafter be described with reference to the accompanying drawings. In the embodiments, a multiprocessor system comprising a processor module A including MPUs 1 and 2 and cache A, and a processor module B including MPUs 3 and 4 and cache B, as shown in FIG. 6, is taken as an example.

Figure 1A:
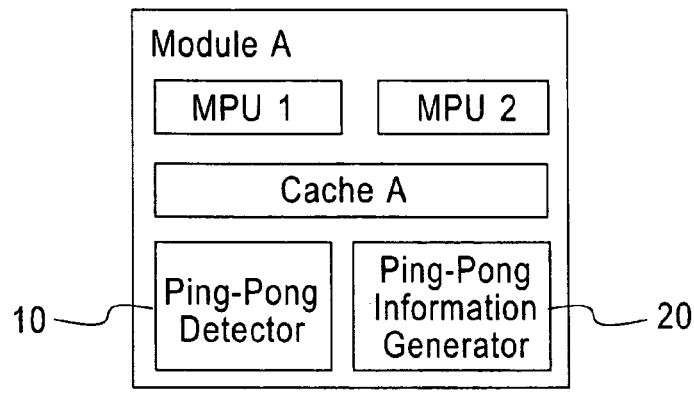
FIG. 1(a) is a block diagram of an example of a processor module according to the present invention.
Figure 1B:
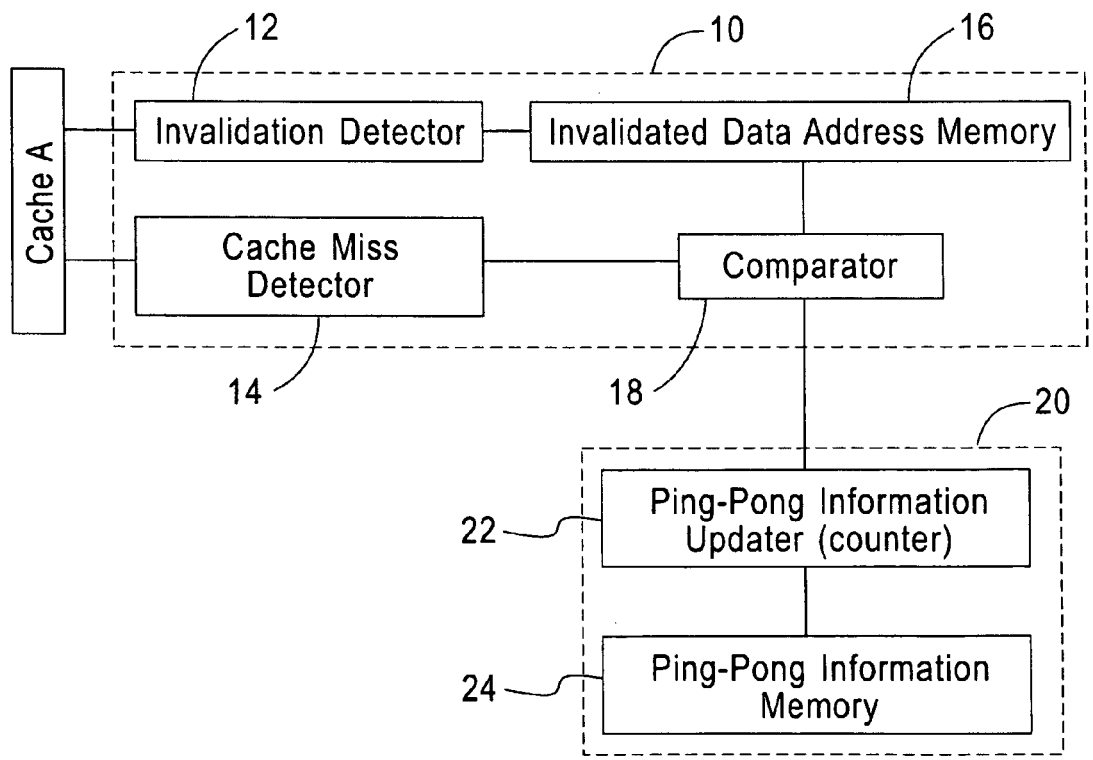
FIG. 1(b) is a block diagram of an example of a ping-pong detector and a ping-pong information generator shown in FIG. 1(a).

As shown in FIG. 1(*a*), a processor module A according to the present invention comprises:

a ping-pong detector 10 for detecting an access by each task to shared data in a cache A, which is also stored in a cache B in a processor module B, and which is invalidated when the shared data in a cache B is updated; and a ping-pong information generator 20 for generating ping-pong information including an address of the invalidated data, an identification number of each MPU which accessed the invalidated data, and the number of times that each MPU accesses the invalidated address.

As shown in FIG. 1(*b*), the ping-pong detector 10 includes: an invalidation detector 12 for detecting invalidated data in the cache A; an invalidated data address memory 16 for storing an address of the invalidated data; a cache miss detector 14 for detecting a cache miss in the cache A; and a comparator 18 for comparing an address of the data that caused the cache miss with the stored address of the invalidated data. The invalidation of data can be detected by finding the address thereof in a tag memory of the cache A, for example.

As shown in FIG. 1(*b*), the ping-pong information generator 20 comprises: a ping-pong information memory 24 for storing the ping-pong information; and a ping-pong information updater 22 for controlling writing of the identification number of each MPU which accessed the invalidated data and the address of the invalidated data to the memory 24, and for counting the number of times that the same MPU accesses the same invalidated address. As in the case of the module A, the module B comprises a ping-pong detector and a ping-pong information generator (not shown).

A scheduler is started by an operating system (OS) to synchronize tasks, for example. In the present invention, as shown is FIG. 2(*b*), when a scheduler starts (S100), ping-pong information is read (S102). After a task allocated to each MPU is identified, each task is reallocated to an MPU in such a manner that the occurrence of ping-pong events is minimized, on the basis of the read ping-pong information (S104, S106). Specifically, ping-pong events are analyzed and tasks are classified into groups (S104), and then the tasks that caused frequent ping-pong events are allocated to the MPUs in the same module (S106).

Figure 2A:
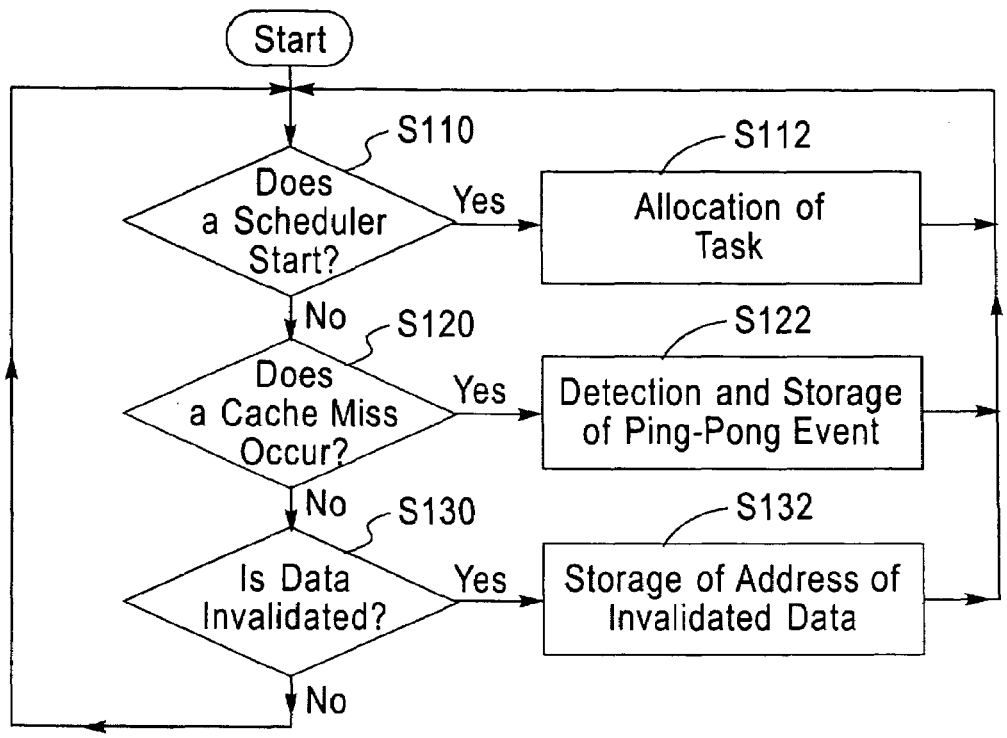
FIG. 2(a) shows an outline of a task allocation procedure of a multiprocessing according to the present invention.
Figure 2B:
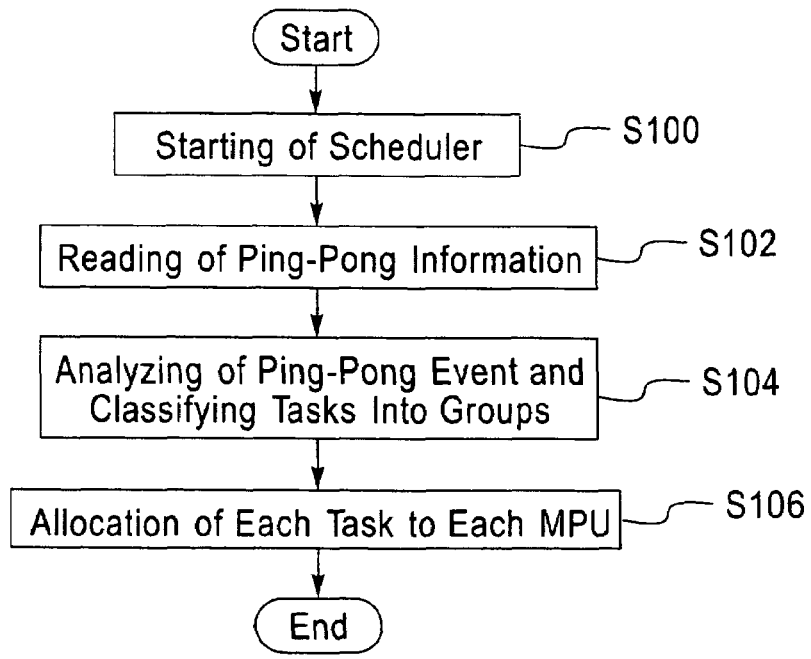
FIG. 2(b) shows details of the task allocation procedure shown in FIG. 2(a).

As shown in FIG. 2(*a*), in multiprocessing according to the present invention, when the scheduler starts (S110), a task is allocated to each MPU (S112). When a cache miss occurs (S120), a ping-pong event is detected and stored (S122). When data is invalidated (S130), an address of the invalidated data is stored (S132).

Next, a method of allocating a task in a multiprocessor system comprising such processor modules will be described.

As in the case shown in FIG. 8(*a*), data requested by the MPUs 1 and 2 are copied form the system memory 2 to the cache A, and data requested by the MPUs 3 and 4 are copied form the system memory 2 to the cache B. In this specification, tasks 1, 2, 3, and 4 are allocated to the MPUs 1, 2, 3, and 4, respectively. For example, as in the case shown in FIG. 8(*b*), when shared data is updated in one of the caches A and B, the unupdated data in the other cash is invalidated (S130), and an invalidation detector 12 detects the invalidation of data. Then, an invalidated data address memory 16 stores an address of the invalidated data (S132).

When a cache miss occurs (S120), the cache miss detector 14 detects the miss and the comparator 18 compares an address of the data that caused the cache miss with an address of the data stored in the invalidated data address memory 16. If the invalidated data was accessed, or a ping-pong event occurred, the two addresses match. When the ping-pong event is detected, an address of the invalidated data and an identification number of an MPU which accessed this address are sent to the ping-pong information updater 22.

The updater 22 controls writing of the identification number of an MPU which accesses the invalidated data and the address of the invalidated data to the ping-pong information memory 24. In this specification, identification numbers of MPUs 1, 2, 3, and 4 are "1", "2", "3", and "4", respectively. When the same identification number and address have been already stored, the updater 22 increments a count value of the data by one.

Examples of ping-pong information are shown in the following TABLEs 1 and 2. The ping-pong information memory 24 stores an address of data that caused a ping-pong event (referred to as "ping-pong address"), an identification number of the MPU (referred to as "MPU ID") that accessed the ping-pong address, and the number of times that the same MPU accessed the same address (referred to as "Count"). TABLE 1 shows ping-pong information of the processor module A, and TABLE 2 shows ping-pong information of the processor module B.

TABLE 1

| Ping-Pong Address | MPU ID (Task ID) | Count |
| --- | --- | --- |
| Address_A | 1 | 100 |
| Address_B | 2 | 8 |
| Address_C | 2 | 60 |
| Address_D | 1 | 3 |

TABLE 2

| Ping-Pong Address | MPU ID (Task ID) | Count |
| --- | --- | --- |
| Address_A | 3 | 80 |
| Address_A | 4 | 20 |
| Address_C | 4 | 50 |
| Address_C | 3 | 10 |

Figure 3A:
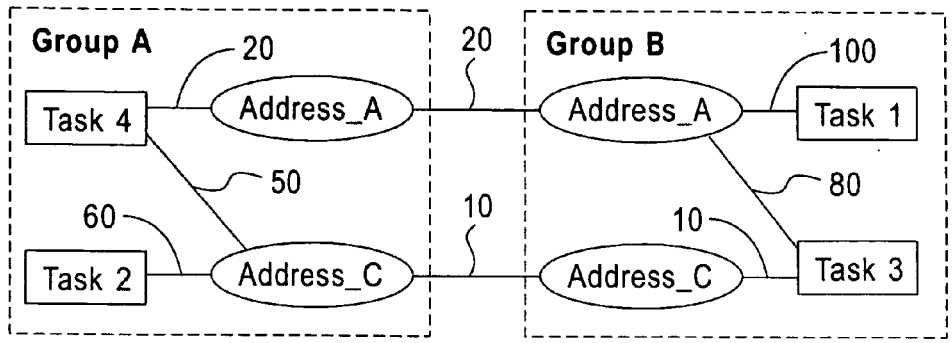
FIG. 3(a) is a block diagram showing an example of optimized task groups.
Figure 3B:
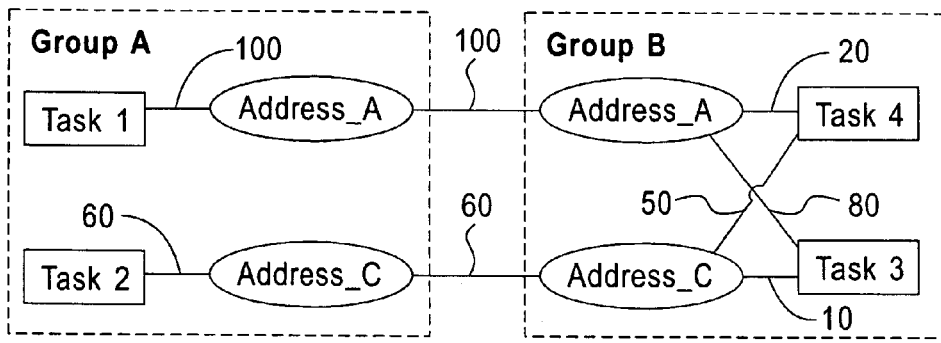
FIG. 3(b) is a block diagram of task groups before optimization.

When the operating system (OS) starts the scheduler (S100), the scheduler reads the ping-pong information (S102). On the basis of an identification number of an MPU (MPU ID), the scheduler finds out an identification number of a task (Task ID) allocated to the MPU. On the basis of the number of accesses (Count), the tasks are reallocated to the MPUs (S104, S106). An outline of a task allocation method is shown in FIGS. 3(a) and 3(b). FIGS. 3(a) and 3(b) are block diagrams showing a relationship between ping-pong addresses and tasks using the number of accesses (counts). Since the tasks 1 and 3 are allocated to the MPUs 1 and 3, respectively, the tasks 1 and 3 are classified into the same group, as shown in FIG. 3(b). In a like manner, the tasks 2 and 4 are classified into the same group.

The task 1 is the most closely related to an Address_A, and the task 3 is the second most closely related to the Address_A. The task 2 is the most closely related to an Address_C, and the task 4 is the second most closely related to the Address_C. The scheduler classifies the tasks into groups according to their close relationship with respective ping-pong addresses. As shown in FIG. 3(a), the tasks 1 and 3, which are closely related to the Address_A, are classified into the same group, and the tasks 2 and 4, which are closely related to the Address_C, are classified into the same group (S104 of FIG. 2(b)).

The scheduler allocates tasks in the same group to MPUs in the same module (S106). For example, the tasks 2 and 4 are allocated to the MPUs 1 and 2 in the processor module A, respectively, and the tasks 1 and 3 are allocated to the MPUs 3 and 4 in the processor module B, respectively. No ping-pong events occur between the MPU 1 and MPU 2 and between the MPU 3 and MPU 4. In FIG. 3(a), the accesses to the Address_C by tasks 2 and 4 and the accesses to the Address_A by the tasks 1 and 3 do not cause any ping-pong event.

However, a ping-pong event occurs when the same data is accessed from the different modules. Before reallocating tasks to MPUs, the same data is accessed from the different modules 160 times.

100+60=160 (times)

However, after reallocating tasks to MPUs, the number of times that data is accessed from the different modules is significantly reduced to 30.

20+10=30 (times)

Since similar process steps are often repeated in multiprocessing, similar ping-pong events tend to repeatedly occur. It is clear from FIGS. 3(a) and 3(b) that the reallocation of tasks as shown in FIG. 3(a) increases the possibility of reducing ping-pong events. The reduction of ping-pong events increases the utilization of processors and the processing speed of the multiprocessor system. Moreover, since the tasks which frequently access the same data are allocated to MPUs in the same module, the frequently-accessed data is stored in the module, and therefore a cache hit is improved.

While an embodiment of the present invention has been described, the present invention can also be materialized in the other embodiments. For example, the number of processing modules used in multiprocessing is not limited to two, but any number of processing modules can be used. The number of MPUs included in the processing module is not limited to two, but any number of MPUs can be used.

The present invention is not limited to the allocation of tasks to processors, but it can also be used for allocating task threads to processors. Since a task is divided into threads, the threads are allocated to respective processors in each module.

An address of invalidated data and an address of data that caused a cache miss can be detected and stored. However, where data is read from and written to a cache on a cache line basis, for example, invalidated data and data that caused a cache miss can be detected and stored on a cache line basis. Specifically, a plurality of data included in the same cache line is regarded as one group, and invalidated data and data that caused a cash miss are detected and stored on a group basis.

Figure 4:
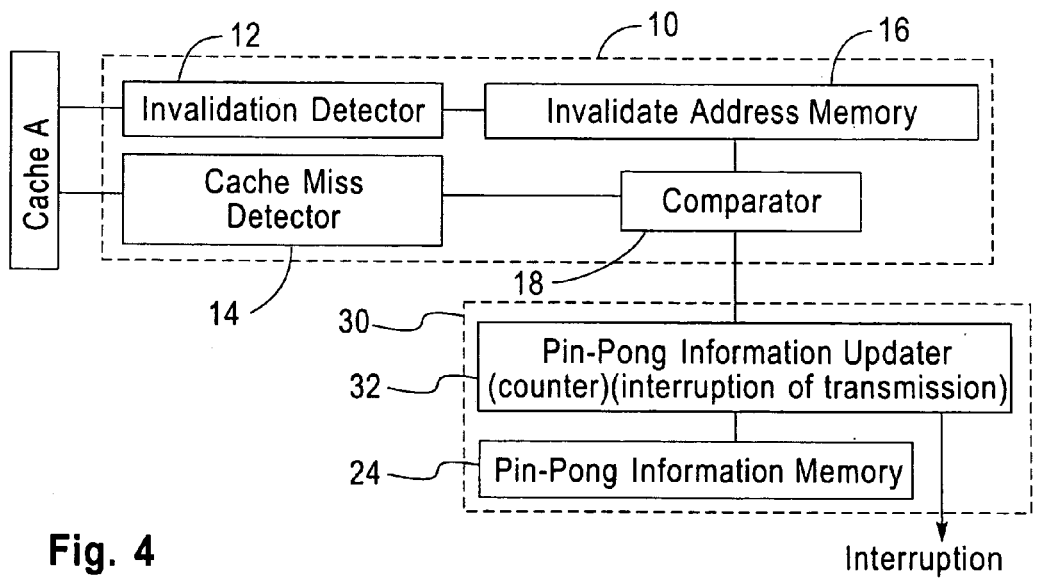
FIG. 4 is a block diagram of another example of a ping-pong information generator in a processor module according to the present invention.

As shown in FIG. 4, a ping-pong information updater 32 determines a total number of accesses (counts) by each task. When the total number of accesses exceeds a predetermined value, the updater 32 can make a request for allocation of tasks to an operating system performing multiprocessing by handling an interrupt. The number of times that an allocation of tasks is optimized can be controlled by changing the predetermined value. Such an allocation of tasks can be performed instead of an activation of the scheduler, or the activation of the scheduler and the interrupt can be performed in combination. The interrupt is also allowed to occur when the number of ping-pong events exceeds a predetermined value.

Figure 5:
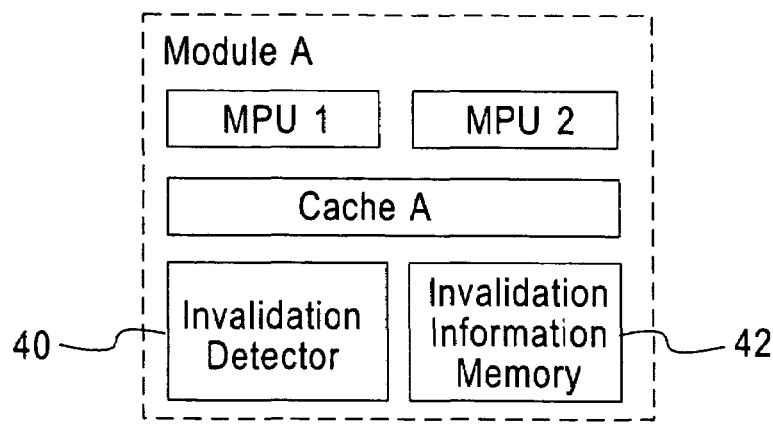
FIG. 5 is a block diagram of another example of a processor module according to the present invention.

Both read and write accesses, or either read access or write access to the invalidated data can be detected. Tasks may be allocated not only on the basis of the number of times that ping-pong events occur, but also on the basis of the invalidation of data, which is performed before ping-pong events occur. For example, as shown in FIG. 5, each module comprises: an invalidation detector 40 for detecting an invalidation of shared data stored in the cache B in a processor module B, which was caused by updating the shared data stored in a cache A; and an invalidation information memory 42 for storing an identification number of a task that caused invalidation, an address of the updated data, and the number of times that the same data is invalidated by the same task. An example of invalidation information is shown in TABLE 3.

TABLE 3

| Invalidate Address | MPU ID (Task ID) | Count |
|---|---|---|
| Address_A | 1 | 100 |
| Address_B | 2 | 8 |
| Address_C | 2 | 60 |
| Address_D | 1 | 3 |

In the same manner as the above embodiment, tasks can be allocated to MPUs on the basis of addresses (Invalidate Address), identification numbers of MPUs (MPU ID), and the number of invalidations (count), which are stored in the invalidation information memory 42. Both ping-pong events and invalidated data may be detected. Instead of data invalidation, tasks can be allocated on the basis of read access to data shared among a plurality of caches. One of or a combination of read access to shared data stored in a plurality of caches, data invalidation, and access to invalidated data can be detected.

When any one of shared data stored in a plurality of caches is updated, data other than the updated data is invalidated and the state of the updated data goes from exclusive state to shared state. Such a transition from the exclusive state to the shared state can be detected instead of detecting the invalidation of data. Each task can be allocated on the basis of the number of times that each task accesses data in a shared state.

Figure 9A:
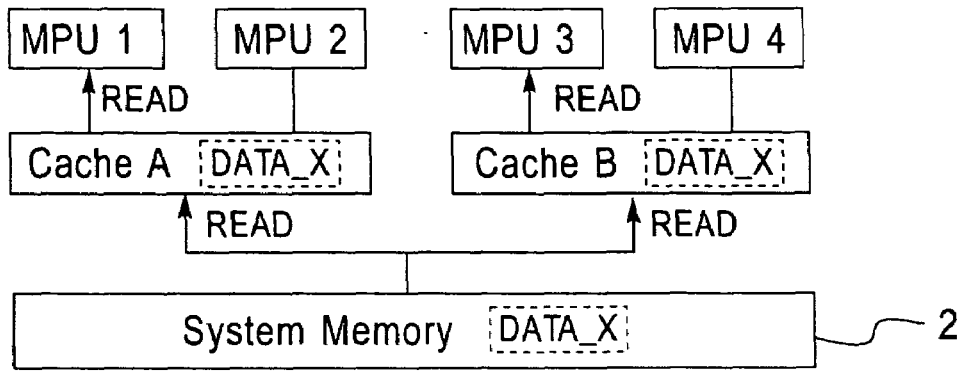
FIGS. 9(*a*), 9(*b*), and 9(*c*) are block diagrams showing another example of data updating and invalidation in a cache shown in FIG. 6.
Figure 9B:
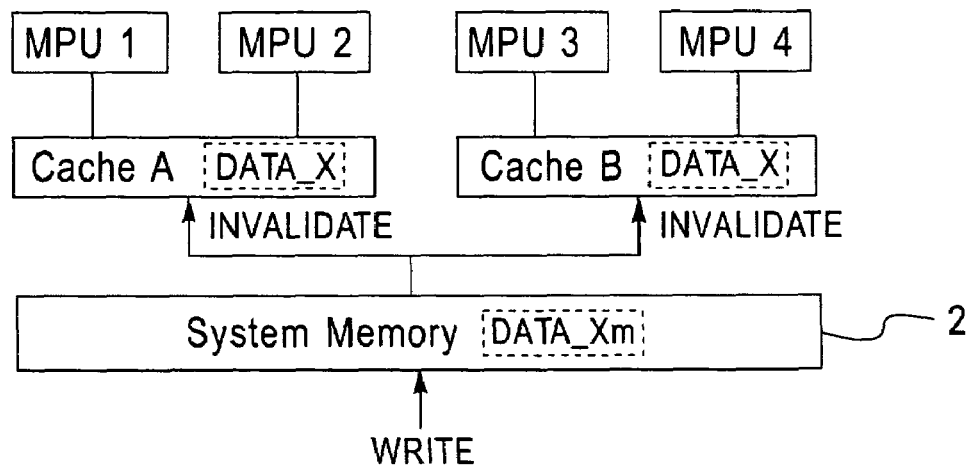
Figure 9C:
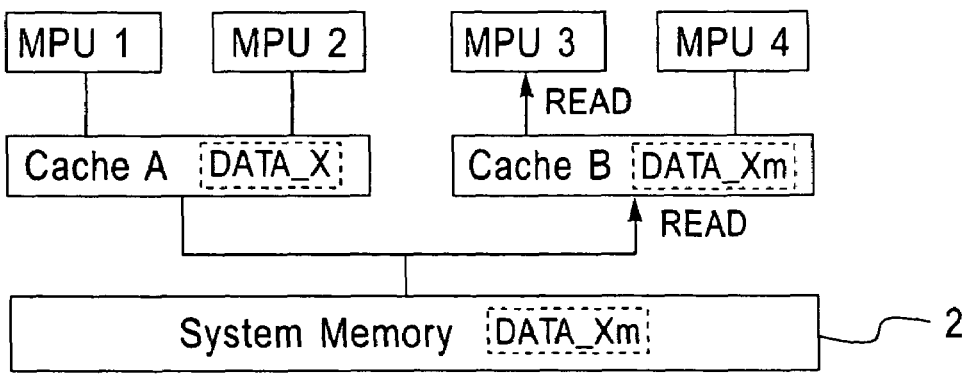
Figure 11:
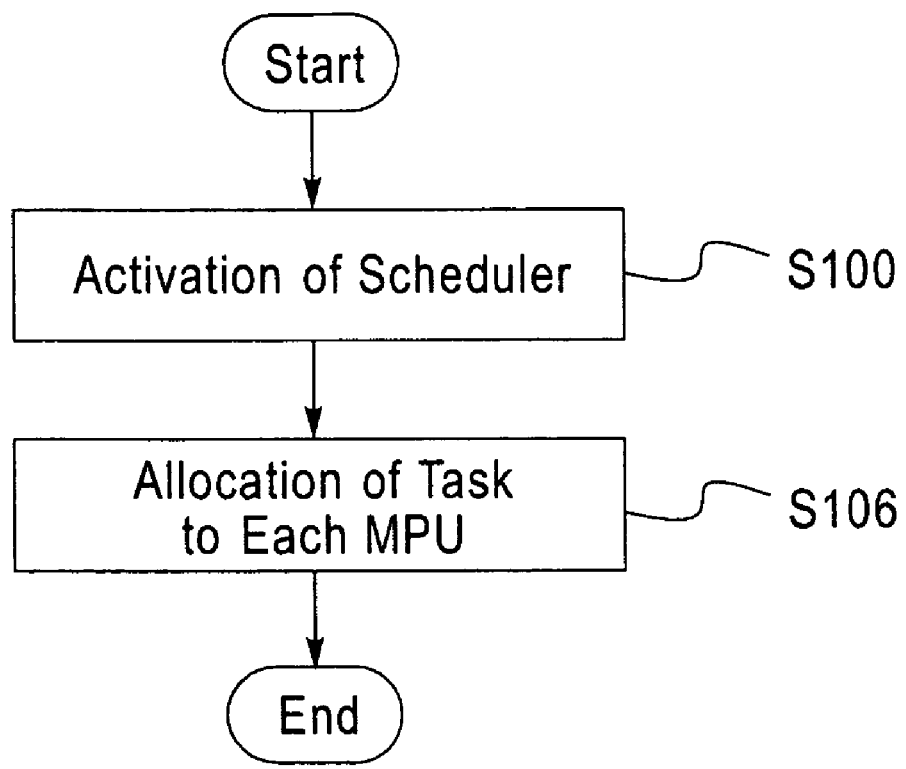
FIG. 11 shows an example of a task allocation procedure of a conventional multiprocessing.

While the present invention has been described with a write-back cache control system taken as an example, a write-through control system can also be employed in the present invention. When the system memory 2 can be directly accessed without having to go through MPUs in DMA (direct memory access) system or the like, data coherency between caches and the system memory 2 must be maintained. For example, as shown in FIG. 9(*a*), when DATA_X, which has been copied from the system memory 2 to the caches A and B, is updated to DATA_Xm in the system memory 2, the DATA_X in the caches A and B are invalidated as shown in FIG. 9(*b*). If a processor requests reading of DATA_X from the cache B, a cache miss occurs. Therefore, the DATA_Xm is copied from the system memory 2 to the cache B, as shown in FIG. 9(*c*).

While the embodiments of the present invention have thus been described with reference to the accompanying drawings, it should be understood that the present invention be not limited to the above embodiments. Various changes, modifications, and improvements can be made to the embodiments on the basis of knowledge of those skilled in the art without departing from the scope of the present invention.

The invention claimed is:

1. In multiprocessing, which is performed by using a plurality of processor modules, each of the plurality of processor modules including a cache memory and a plurality of processors sharing the cache memory, a method of allocating a task to each processor comprising the steps of:
    monitoring access conditions of respective tasks to data shared among cache memories in the processor modules; and
    allocating tasks that make frequent accesses to the same shared data to processors in the same module, on the basis of said access conditions;
    wherein said step of monitoring access conditions comprises the substeps of:
        detecting an update to the shared data stored in a cache memory in one of the processor modules, said update causing an invalidation of the shared data stored in the cache memories in the other processor modules; and
        storing identification information of tasks that caused said invalidation, and an address of the updated data, and the number of invalidations of the same data by the same task; and
    wherein said step of allocating tasks comprises the substeps of:
        classifying tasks into groups on the basis of the number of invalidations of the same data; and
        allocating tasks in the same group to respective processors in the same processor module.

2. The method according to claim 1, further comprising the step of: making a request for allocation of tasks to an operating system performing multiprocessing, when the total number of said stored invalidations or said accesses exceeds a predetermined value.

3. In multiprocessing, which is performed by using a plurality of processor modules, each of the plurality of processor modules including a cache memory and a plurality of processors sharing the cache memory, a method of allocating a task to each processor comprising the steps of:
    monitoring access conditions of respective tasks to data shared among cache memories in the processor modules; and
    allocating tasks that make frequent accesses to the same shared data to processors in the same module, on the basis of said access conditions;
    wherein said step of monitoring access conditions comprises the substeps of:
        detecting and storing an update to the shared data stored in one of the cache memories, said update causing an invalidation of the shared data stored in the other cache memories; and
        monitoring access conditions of respective tasks to the invalidated data, and
    wherein said step of allocating tasks comprises:
        classifying tasks into groups on the basis of the number of invalidations of the same data; and
        allocating tasks in the same group to respective processors in the same processor module.

4. The method according to claim 3, wherein said substep of monitoring access conditions comprises:
   detecting an access to the invalidated data; and
   storing an address of the invalidated data, identification information of a task that accessed the invalidated data, and the number of accesses to the same shared data by the same task.

5. The method according to claim 4, wherein said detecting an access to the invalidated data comprises detecting an invalidation of data; storing an address of the invalidated data detecting a cache miss; comparing an address of the data that caused the cache miss with the stored address of the invalidated data.

6. The method according to claim 5, further comprising the step of: making a request for allocation of tasks to an operating system performing multiprocessing, when the total number of said stored invalidations or said accesses exceeds a predetermined value.

7. The method according to claim 4, further comprising the step of: making a request for allocation of tasks to an operating system performing multiprocessing, when the total number of said stored invalidations or said accesses exceeds a predetermined value.

8. A multiprocessor system, in which a plurality of processor modules, each of the plurality of processor modules including one cache memory and a plurality of processors sharing the cache memory are used, comprising:
   a plurality of processor modules including:
      a detector for detecting accesses by respective tasks to data shared among cache memories in the processor modules; and
      a storage device for storing an address of the shared data, identification information of the tasks that accessed the shared data, and the number of accesses to the same shared data by the same task; and
   an allocator for allocating tasks that make frequent accesses to the same shared data to processors in the same module, on the basis of the number of accesses;
   wherein said detector for detecting accesses comprises:
      a first device for detecting an update to the shared data stored in a cache memory in one of the processor modules, said update causing an invalidation of the shared data stored in the cache memories in the other processor modules; and
      a second device for storing identification information of a task that caused said invalidation, and an address of the updated data, and the number of invalidations of the same data by the same task.

9. The multiprocessor system according to claim 8, further comprising: request means for making a request for allocation of tasks to said allocator for allocating tasks, when the total number of said stored invalidations or said accesses exceeds a predetermined value.

10. The multiprocessor system according to claim 8, further comprising: request means for making a request for allocation of tasks to said allocator for allocating tasks, when the total number of said stored invalidations or said accesses exceeds a predetermined value.

11. A multiprocessor system, in which a plurality of processor modules, each of the plurality of processor modules including one cache memory and a plurality of processors sharing the cache memory are used, comprising:
   a plurality of processor modules including:
      a detector for detecting accesses by respective tasks to data shared among cache memories in the processor modules, and
      a storage device for storing an address of the shared data; identification information of the tasks that accessed the shared data, and the number of accesses to the same shared data by the same task; and
   an allocator for allocating tasks that make frequent accesses to the same shared data to processors in the same module, on the basis of the number of accesses;
   wherein said detector for detecting accesses comprises:
      a first device for detecting and storing an update to the shared data stored in one of a plurality of cache memories, said update causing an invalidation of the shared data stored in the other cache memories; and
      an access detector for detecting accesses to the invalidated data by respective tasks;
   wherein said first device for detecting and storing an update to the shared data comprises:
      invalidation means for detecting an invalidation of data; and
      first address means for storing an address of the invalidated data; and
   wherein said access detector for detecting accesses comprises:
      cache detector means for detecting a cache miss; and
      second address means for comparing an address of the data that caused the cache miss with the stored address of the invalidated data.

12. The plurality of processor module according to claim 11, further comprising: request means for making a request for allocation of tasks to an operating system performing multiprocessing, when the total number of said stored invalidations or said accesses exceeds a predetermined value.

13. A plurality of processor modules for use in a multiprocessor system, each of the plurality of processor modules including a cache memory and a plurality of processors sharing the cache memory, comprising:
   a detector for detecting accesses by respective tasks to data shared among cache memories in the processor modules; and
   a storage device for storing an address of the shared data, identification information of the tasks that accessed the shared data, and the number of accesses to the same shared data by the same task;
   wherein said detector for detecting accesses comprises:
      a first device for detecting an update to the shared data stored in a cache memory in one of the processor modules, said update causing an invalidation of the shared data stored in the cache memories in the other processor modules; and
      a second device for storing identification information of a task that caused said invalidation, and an address of the updated data, and the number of invalidations of the same data by the same task.

14. The plurality of processor module according to claim 13, further comprising: request means for making a request for allocation of tasks to an operating system performing multiprocessing, when the total number of said stored invalidations or said accesses exceeds a predetermined value.

15. A plurality of processor modules for use in a multiprocessor system, each of the plurality of processor modules including a cache memory and a plurality of processors sharing the cache memory, comprising:
   a detector for detecting accesses by respective tasks to data shared among cache memories in the processor modules; and a storage device for storing an address of the shared data, identification information of the tasks that accessed the shared data, and the number of accesses to the same shared data by the same task;

wherein said means for detecting accesses comprises:
   a first device for detecting and storing an update to the shared data stored in one of the cache memories, said update causing an invalidation of the shared data stored in the other cache memories; and
   an access detector for detecting accesses to the invalidated data by respective tasks; and wherein said means for detecting and storing an update to the shared data comprises:
   invalidation means for detecting an invalidation of data; and
   first address means for storing an address of the invalidated data; and wherein said access detector for detecting accesses comprises:
   cache detector means for detecting a cache miss; and
   second address means for comparing an address of the data that caused the cache miss with the stored address of the invalidated data.

* * * * *